(12) United States Patent
Gillespie et al.

(10) Patent No.: US 10,675,683 B2
(45) Date of Patent: Jun. 9, 2020

(54) LAMINAR VERTICAL POWDER FLOW FOR ADDITIVE MANUFACTURING

(71) Applicant: GENERAL ELECTRIC COMPANY, Schenectady, NY (US)

(72) Inventors: Shane Matthew Gillespie, Cincinnati, OH (US); James Shealy, Cincinnati, OH (US); Scott Alan Gold, Cincinnati, OH (US); Thomas Graham Spears, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 856 days.

(21) Appl. No.: 15/059,105

(22) Filed: Mar. 2, 2016

(65) Prior Publication Data

US 2017/0252805 A1    Sep. 7, 2017

(51) Int. Cl.
| | | |
|---|---|---|
| *B29C 67/00* | (2017.01) | |
| *B22F 3/105* | (2006.01) | |
| *B28B 1/00* | (2006.01) | |
| *C04B 35/622* | (2006.01) | |
| *B29C 64/245* | (2017.01) | |
| *B29C 64/153* | (2017.01) | |
| *B33Y 10/00* | (2015.01) | |
| *B33Y 30/00* | (2015.01) | |

(52) U.S. Cl.
CPC ............ *B22F 3/1055* (2013.01); *B28B 1/001* (2013.01); *B29C 64/153* (2017.08); *B29C 64/245* (2017.08); *C04B 35/62204* (2013.01); *B22F 2003/1056* (2013.01); *B22F 2003/1059* (2013.01); *B33Y 10/00* (2014.12); *B33Y 30/00* (2014.12); *C04B 2235/6026* (2013.01); *Y02P 10/24* (2015.11); *Y02P 10/295* (2015.11)

(58) Field of Classification Search
CPC ... B29C 64/153; B29C 64/245; B22F 3/1055; B22F 2003/1056; B22F 2003/1059; B28B 1/001; C04B 35/62204; C04B 2235/6026; B33Y 10/00; B33Y 30/00; Y02P 10/24; Y02P 10/295
USPC ............................... 425/174.4, 375; 264/308
See application file for complete search history.

(56) References Cited

U.S. PATENT DOCUMENTS

| | | | |
|---|---|---|---|
| 6,995,334 B1 | 2/2006 | Kovacevic et al. | |
| 7,777,155 B2 | 8/2010 | Twelves, Jr. et al. | |
| 2005/0263934 A1 | 12/2005 | Chung et al. | |
| 2011/0223349 A1* | 9/2011 | Scott ................ | B22F 3/1055 427/532 |
| 2014/0271328 A1 | 9/2014 | Burris et al. | |
| 2014/0314964 A1 | 10/2014 | Ackelid | |
| 2014/0363585 A1 | 12/2014 | Pialot et al. | |
| 2015/0054191 A1 | 2/2015 | Ljungblad | |
| 2015/0165524 A1 | 6/2015 | Ljungblad et al. | |

(Continued)

*Primary Examiner* — Joseph S Del Sole
*Assistant Examiner* — Lawrence D. Hohenbrink, Jr.
(74) *Attorney, Agent, or Firm* — Dority & Manning, P.A.

(57) ABSTRACT

A method and apparatus for additive manufacturing is provided whereby a curtain of powder is provided adjacent a vertically oriented build plate, and a laser melts or sinters the powder over a region of the build plate. The curtain of powder is moved relative to the build plate to maintain the same distance between the curtain and the previously deposited layer, and the process repeated to provide a three dimensional structure on the build plate.

10 Claims, 3 Drawing Sheets

(56) References Cited

U.S. PATENT DOCUMENTS

2016/0193696 A1* 7/2016 McFarland ............ B22F 3/1055
2018/0133956 A1* 5/2018 Buller .................... B33Y 10/00

* cited by examiner

LAMINAR VERTICAL POWDER FLOW FOR ADDITIVE MANUFACTURING

This invention relates to a technique for laser additive manufacturing using a laminar vertical flow of powder.

BACKGROUND

Powder beds are commonly used in laser bed additive manufacturing techniques. These techniques generally require a step of providing a thin layer of powder over a build plate within the additive manufacturing apparatus. In one example, a powder dispenser 101 is provided that pushes an amount of powder (e.g., CoCr) upward into the build chamber where a roller or arm 102 spreads the powder over the build plate 103. FIG. 1. A laser heats the powder in a desired pattern corresponding to a cross section of a part, sintering or melting the powder to form a solid cross section slice on the build plate 103. The build plate is lowered and the powder dispenser and roller or arm redistributes a thin layer of powder over the build plate. The laser then heats the powder building on the earlier deposited pattern of fused material, thereby making successive layers in the additive manufacturing process.

Another way that a thin layer of powder is provided upon a build plate is through a powder hopper 201 used in conjunction with a recoater arm/temporary hopper 202. FIG. 2. The recoater arm/temporary hopper 202 spreads a thin layer of powder over the build plate 203 by moving across the build plate and dropping powder in a controlled manner to provide a thin layer of powder. This process is repeated with each laser writing step and lowering of the build plate in the additive manufacturing process.

The existing technology requires a time consuming step of providing a thin uniform layer of powder over a horizontal build plate using either recoater arm and/or a hopper. There is a need in the art for a higher throughput higher uniformity additive manufacturing process and apparatus.

BRIEF DESCRIPTION OF THE INVENTION

In one embodiment, the invention relates to methods of manufacturing a three dimensional structure, including steps of providing a vertical curtain of powder adjacent to a vertically oriented build plate; scanning a focused energy beam on a region of the vertical curtain to sinter or melt the powder to the vertical oriented build plate over the region; and moving the vertical curtain or build plate, or both, by a set distance and repeating the scanning to build the three dimensional structure on the build plate. The powder is preferably a metallic alloy, polymer, or ceramic powder. Unused powder can be collected in a receptacle, and if desired can be recycled. The powder curtain is preferably a laminar flow of powder, and can be provided by feeding the powder through a hopper with a linear opening whose length defines the curtain length. The focused energy beam is preferably a laser. The set distance is preferably changed by moving the vertical curtain of powder relative to the build plate, or moving the build plate relative to the vertical curtain of powder.

In another embodiment, the invention relates to an apparatus for manufacturing a three dimensional component, including a vertically oriented build plate; a powder feed mechanism adapted to provide a powder curtain adjacent the build plate, wherein the relative spacing between the powder curtain and the build plate is adjustable; a focused energy beam adapted to sinter or melt powder from the powder curtain onto the build plate; and a controller adapted to scan the focused energy beam over a region of the build plate. The apparatus may comprise a receptacle adapted to collect unused powder. The apparatus may also comprise a device for sieving and recycling unused powder. The powder feed mechanism may be a hopper, and the hopper can have a linear opening whose length defines the curtain length. The focused energy beam is preferably a laser but may also include other focused energy beams such as electron beam if conducted in a vacuum environment and appropriate scale. In one aspect, the relative spacing is provided by the build plate being movable relative to the powder feed mechanism. In another aspect, the relative spacing is provided by the powder feed mechanism being movable relative to the build plate. The relative spacing may be provided by a controller, and the controller may be a computerized controller.

DETAILED DESCRIPTION OF THE INVENTION

The present invention relates to additive manufacturing generally, and may include implementations of a variety of additive manufacturing techniques. In addition, the invention may include application of multiple additive technologies within a single apparatus or method. The additive techniques that may be implemented in accordance with the present invention include, but are not limited to, selective laser sintering (SLS), direct metal laser sintering (DMLS), selective laser melting (SLM), direct metal laser melting (DMLM), and three dimensional printing (3DP). The powder materials can include metallic alloy, polymer, or ceramic powders. Exemplary metallic powder materials are stainless steel alloys, aluminum alloys, titanium alloys, nickel based superalloys, and cobalt based superalloys. In each of these powder based fabrication methods, powdered material is melted or sintered to form each part layer. For example, the SLS process utilizes powdered plastic, metal or ceramic materials that are selectively sintered by a laser layer-by-layer.

Figure 1:
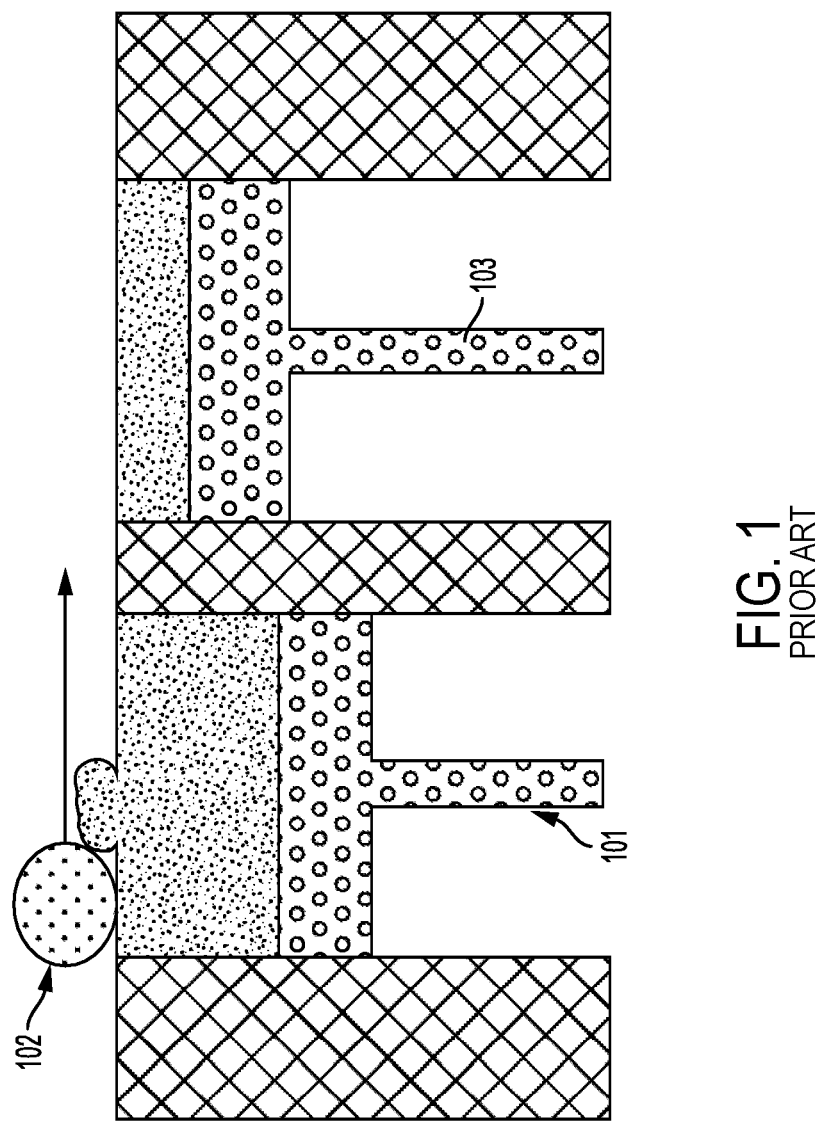
FIG. 1 is a schematic view of a conventional additive manufacturing apparatus using a recoater arm to distribute powder in a horizontal fashion over a build plate.
Figure 2:
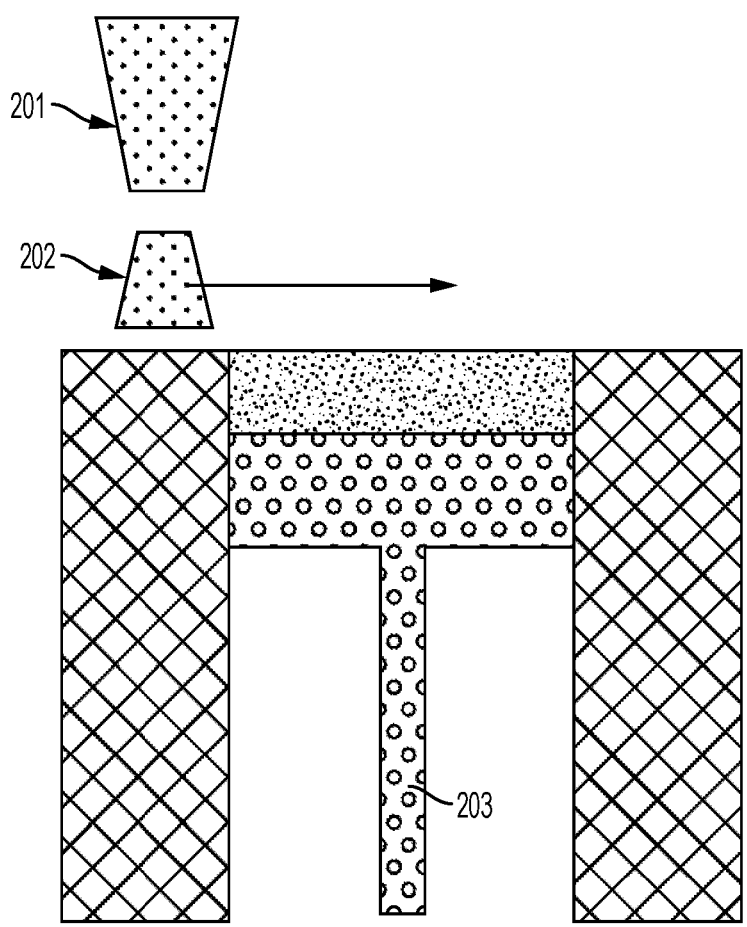
FIG. 2 is a schematic view of a conventional additive manufacturing apparatus using a hopper to distribute powder in a horizontal fashion over a build plate.
Figure 3:
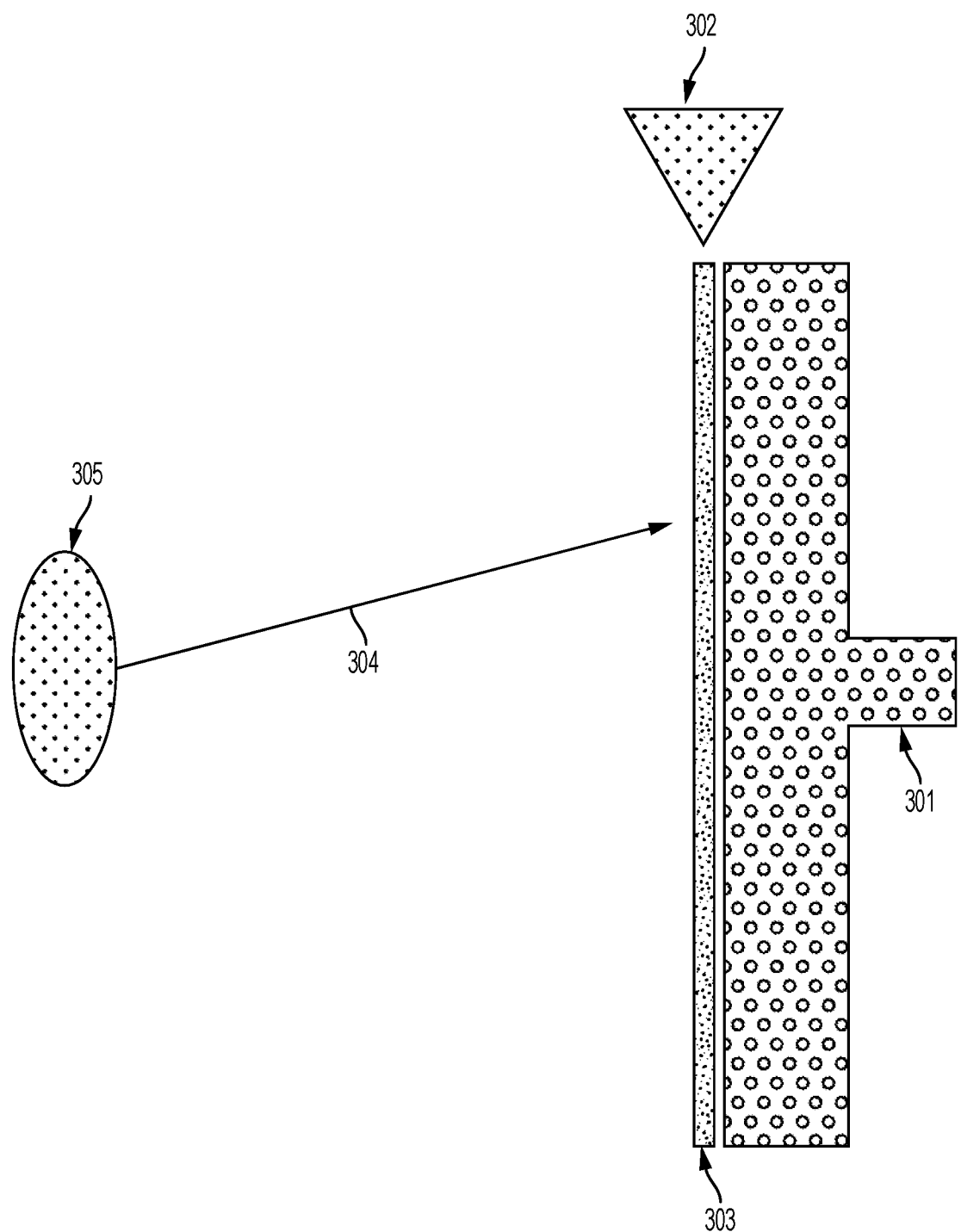
FIG. 3 is a schematic showing an embodiment of the invention utilizing a powder curtain and vertical build plate for additive manufacturing.

The apparatus according to the present invention includes a vertically oriented build plate 301. FIG. 3. A powder feed mechanism 302 provides a vertically oriented curtain of powder 303 adjacent the build plate 301. The powder feed mechanism 302 may be a hopper, which has a linear opening whose length defines the powder curtain 303 length and can be sized according to the dimensions of the build plate 301. A laser 304 provides a source of focused energy that sinters or melts the powder form the powder curtain 303 to the build plate 301 to provide a pattern of melted material on the build plate 301. The laser beam 304 can be controlled through a mirror 305 by a computer to write patterns of melted or sintered material onto the build plate 301. The focused energy beam is preferably a laser. The laser may have a power that can range from 50 W to 1 kW, preferably within the range of 50 W to 250 W, more preferably within the range of 90 W to 210 W, and most preferably within the range of 100-200 W. The apparatus may also include a receptacle and means to collect, sieve and recycle unused powder. The apparatus also includes a means for controlling the distance between the vertical powder curtain 303 and the face of the build plate 301. After each step of melting a pattern onto the build plate 301, the distance between the powder curtain 303 and the build plate is increased 301 to write an additional layer or pattern, thereby creating a three-dimensional structure. Regardless of which way the distance is controlled, the apparatus maintains the distance between the powder curtain and the previously printed layer at a constant distance.

In one aspect of the invention, the laser scanner element is capable of adjusting focal distance and location. This aspect is particularly useful in embodiments where the curtain of powder is moved relative to the build plate. In this case, the laser is refocused onto the portions of the powder curtain to be sintered. In another aspect of the invention, the laser focal position is constant and the build plate is moved along five axes by a robotic arm.

The method for additive manufacturing according to an embodiment of this invention includes steps of providing a vertical curtain of powder 303 adjacent to a vertically oriented build plate 301. FIG. 3. Scanning a focused energy beam (i.e., laser) 304 on a region of the vertical curtain 301 to sinter or melt the powder to the vertical oriented build plate 301 over the region. Followed by moving the vertical curtain 303 or build plate 301, or both, by a set distance and repeating the scanning to build the three dimensional structure on the build plate. The methods according to this invention desirably eliminate the step of using a roller arm or hopper to coat a layer of material over a horizontal plate. Rather, the present invention allows a continuous process for building a three dimensional structure using additive manufacturing.

Exemplary embodiments of an additive manufacturing process and apparatus are provided above in detail. The methods and systems are not limited to the specific embodiments described herein, but rather components of the methods and systems may be utilized independently and separately from other components described herein. For example, the methods and systems described herein may have other industrial and/or consumer application and are not limited to practice in any particular field or industry. Rather, the present invention can be implemented and utilized in connection with many other industries. While the invention has been described in terms of various specific embodiments, those skilled in the art will recognize that the invention can be practiced with modification within the spirit and scope of the claims.

What is claimed is:

1. An apparatus for manufacturing a three dimensional component, the apparatus comprising:
    a) a vertically oriented build plate;
    b) a powder feed mechanism adapted to provide a powder curtain adjacent the build plate, wherein a relative spacing between the powder curtain and the build plate is adjustable;
    c) a focused energy beam adapted to sinter or melt powder from the powder curtain onto the build plate; and
    d) a controller adapted to scan the focused energy beam over a region of the build plate.

2. The apparatus of claim 1, wherein the powder is a metallic alloy, polymer, or ceramic powder.

3. The apparatus of claim 1, further comprising a receptacle adapted to collect unused powder.

4. The apparatus of claim 1, wherein the powder feed mechanism is a hopper.

5. The apparatus of claim 4, wherein the hopper comprises a linear opening whose length defines a curtain length.

6. The apparatus of claim 1, wherein the focused energy beam is a laser.

7. The apparatus of claim 1, wherein the relative spacing is provided by the build plate being movable relative to the powder feed mechanism.

8. The apparatus of claim 1, wherein the relative spacing is provided by the powder feed mechanism being movable relative to the build plate.

9. The apparatus of claim 1, wherein the relative spacing is controlled by the controller.

10. The apparatus of claim 1, wherein the controller is a computerized controller.

* * * * *